United States Patent [19]
Siewert et al.

[11] Patent Number: 5,131,224
[45] Date of Patent: Jul. 21, 1992

[54] METHOD FOR REDUCING METHANE EXHAUST EMISSIONS FROM NATURAL GAS FUELED ENGINES

[75] Inventors: Robert M. Siewert, Birmingham; Patricia J. Mitchell, Troy, both of Mich.

[73] Assignee: General Motors Corporation, Detroit, Mich.

[21] Appl. No.: 556,138

[22] Filed: Jul. 23, 1990

[51] Int. Cl.⁵ .............................. F01N 3/20
[52] U.S. Cl. .................... 60/274; 423/213.5
[58] Field of Search ........... 60/274, 299, 281, 301, 60/285; 423/213.5

[56] References Cited

U.S. PATENT DOCUMENTS

| | | | |
|---|---|---|---|
| 2,330,664 | 9/1943 | Bennett | 423/213.5 |
| 3,000,707 | 9/1961 | Barstow | 60/309 |
| 3,464,801 | 9/1969 | Barstow | 60/281 |
| 3,807,173 | 4/1974 | Zmuda | 60/302 |
| 3,935,705 | 2/1976 | Hergoualch | 60/302 |
| 4,274,373 | 6/1981 | Sugasawa | 60/276 |

FOREIGN PATENT DOCUMENTS

33233 2/1986 Japan.

OTHER PUBLICATIONS

Robert Bosch GmbH, "Kraftfahr Technisches Taschenbuch", Jan. 1976, VDI-Verlay, Dusseldorf, p. 275.
Klimstra, "Catalytic Converters for Natural Gas Fueled Engines—A Measurement and Control Problem", SAE Paper 872165, 1987.
Section entitled "Task 2.2 Low HC Catalyst", pp. 29-31, taken from Natural Gas Engine Technology, Report GETA 90-01, given in looseleaf form to members of the Gas Engine Technical Advisory Council at their first meeting, May 16, 1990.
Engh et al., "Development of the Volve Lambda-Sond System", SAE Paper 77-295, 1978.
Mooney et al., "Three-Way Conversion Catalyst—Part of the New Emission Control System", SAE Paper 770365, 1978.

*Primary Examiner*—Douglas Hart
*Attorney, Agent, or Firm*—George A. Grove

[57] ABSTRACT

High conversion efficiencies for methane, other unburned hydrocarbons, carbon monoxide and nitrogen oxides can be obtained from a natural gas or methane fueled engine by operating the engine with an air-fuel ratio within a range that includes the stoichiometric air-fuel ratio and extends to the fuel-rich side and by employing in combination with the engine a platinum or platinum and palladium noble metal catalyst for treatment of the engine exhaust gases.

3 Claims, 2 Drawing Sheets

METHOD FOR REDUCING METHANE EXHAUST EMISSIONS FROM NATURAL GAS FUELED ENGINES

This invention pertains to the operation of a natural gas fueled engine and the catalytic treatment of its exhaust so as to minimize the emission of methane and other pollutants.

BACKGROUND

Although most automobile and truck engines (automotive vehicle engines) are operated on gasoline or diesel fuel, natural gas is recognized as a potential fuel for automotive vehicles because it is viewed as a "clean" fuel. Natural gas comprises mostly methane ($CH_4$). It has been found that engines operated with methane or natural gas as a fuel produce lower amounts per mile of carbon monoxide, carbon dioxide and unburned hydrocarbons of the type that contribute to smog than engines operated on gasoline. The lower quantity of such hydrocarbon emissions is seen as particularly beneficial because of the corresponding reduction in the formation of ground level ozone. The reduction in carbon dioxide is also beneficial because carbon dioxide is a greenhouse effect gas. Since gasoline and natural gas are both hydrocarbon fuels, it would seem that operating practices and exhaust treatment techniques developed for gasoline engines would be directly applicable to methane-fueled engines. However, such is not the case.

Over the past 20 years, noble metal catalysts supported on high surface area (100 $m^2/g$) alumina carriers have been developed to complete the oxidation of carbon monoxide and unburned hydrocarbons in gasoline engine exhaust. Platinum and/or palladium dispersed as very fine particles on pellets or grains of alumina have served as oxidation catalysts These catalysts have proven most effective when there is an excess of oxygen in the exhaust gas resulting when the engine is operating in a fuel-lean or excess-air mode. The catalytic conversion of nitrogen oxides to nitrogen is a chemical reduction-type reaction which is most favorably carried out in an oxygen-deficient environment that is the antithesis of a favorable oxidation reaction medium. However, the noble metal rhodium has been successfully used in combination with platinum, palladium or platinum and palladium as a "three-way catalyst". Under suitable engine operating conditions, a three-way catalyst promotes simultaneously the oxidation of carbon monoxide to carbon dioxide, the oxidation of unburned hydrocarbons to carbon dioxide and water and the reduction of nitrogen oxides to nitrogen.

Three-way catalysts work most effectively when the engine is operated with the air-fuel mixture at about stoichiometric proportions. An oxygen sensor is used in the exhaust gas stream to detect whether the engine is then operating in a fuel-rich or fuel-lean mode. Output from the sensor is used by the engine control computer to continually effect rapid adjustments in the fuel-to-air mass ratio so that the combustible charge to the engine cycles close to the stoichiometric air-fuel mixture. The actual air-fuel ratio is thus sensed and changed as necessary so as to reduce engine out emissions and to provide a suitable feed stream to the engine exhaust treatment catalytic converter. By thus cycling the engine air-fuel ratio, a three-way catalyst is able to promote and support its three pollutant-destroying reactions more or less simultaneously.

This three-way catalyst practice represents the current state of the art in gasoline-fueled engine exhaust treatment. Three-way catalysts comprise a combination of platinum, palladium or platinum and palladium with a small amount of rhodium, all dispersed as extremely fine particles on a high surface area alumina ($Al_2O_3$) carrier. The alumina is thermally stabilized in its high surface area form by the presence of suitable additives such as ceria, lanthana and others. Suitable additions of ceria ($CeO_2$) may also promote the oxidation capacity of the catalyst when the exhaust is momentarily in an oxygen-deficient state.

The problem that has been discovered with natural gas (methane, $CH_4$) fueled engines is that when operated with three-way catalysts in accordance with gasoline-fueled engine practices, unburned methane passes unoxidized through the exhaust system into the atmosphere. Although methane is not poisonous and it is not a reactive hydrocarbon in the sense that it promotes ozone formation at low altitudes, it is a greenhouse effect gas. It remains in the atmosphere and has many times the atmospheric heat-reflecting effect of carbon dioxide.

We have found that unlike higher molecular weight hydrocarbon gases, methane is not readily oxidized in an oxygen-rich exhaust gas over the traditional noble metal catalysts These catalysts do not become "active" to oxidize methane until heated to very high temperatures (e.g., 600° C. or higher) which the exhaust gases usually do not attain Thus, while the engine out emissions with methane fuel are favorable compared to gasoline-fueled engines, there remains the problem of preventing unburned methane from escaping the vehicle's exhaust system into the atmosphere.

It has been observed in the operation of natural gas-fueled stationary engines, typically used in the generation of electrical energy and the concomitant production of process heat, that the conventional three-way catalysts will effect some conversion of each of methane, HC, CO and NOx if the engine is operated in a very narrowly controlled air-to-fuel ratio that is just fuel-rich of the stoichiometric mixture. However, it is necessary to have a better and more flexible catalyst system and engine operating system for natural gas-fueled automobile engines to prevent methane enrichment of the atmosphere. Unlike stationary engines, automobile engines experience warm-up operating conditions and other transient operating conditions of widely varying load and speed.

It is an object of this invention to provide a method of engine operation and exhaust gas treatment for natural gas-fueled automobile engines that provide good fuel economy and effectively reduce the quantity of carbon monoxide (CO), unburned hydrocarbons (HC) including methane ($CH_4$), and nitrogen oxides (NOx) that are discharged to the atmosphere.

BRIEF SUMMARY OF THE INVENTION

In accordance with the preferred embodiment of our invention, this and other objects and advantages are accomplished as follows We have discovered that, surprisingly we think, by operating a methane-fueled engine with an air-fuel mixture that on average is slightly fuel-rich of the stoichiometric mixture and using a platinum or platinum-palladium (non-rhodium) catalytic converter for exhaust gas treatment, total hydrocarbon (including methane), carbon monoxide and nitrogen oxide emissions are very low. The ratio of natural gas or like methane-containing fuel to air is controlled during engine operation, preferably within about two percentage points of the stoichiometric value but with the average value biased on the fuel-rich side. The average set-point at any moment for a given engine will depend upon its load, speed and other engine operating conditions Of course, there will be variations from the average. In general, at engine operating conditions producing a relatively low temperature exhaust, we prefer a more fuel-rich mixture for methane conversion. This engine operating mode still provides improved fuel economy over an equivalent gasoline-fueled engine and therefore reduced quantities of carbon dioxide as well as reduced levels of the controlled pollutants. However, there is some unburned methane. The methane and the controlled pollutants are all simultaneously effectively treated by a platinum or platinum-palladium catalyst which surprisingly is an effective oxidizer of HC, $CH_4$ and CO even in the fuel-rich (oxygen deficient) exhaust medium. Furthermore, the Pt/Pd catalyst has a significantly higher hydrocarbon (including $CH_4$) conversion efficiency under these operating conditions even at low temperatures ($\leq 300°$ C.) than the rhodium-containing three-way catalysts Other objectives and advantages of our invention will be apparent from a detailed description which follows. Reference will be had to the drawings in which:

DETAILED DESCRIPTION OF A PREFERRED EMBODIMENT

We have developed and tested the practice of our invention on a production 2.8 L displacement, 60° V-type six cylinder gasoline engine. Other specifications for the engine were as follows: bore: 89 mm; stroke: 76 mm; compression ratio: 8.9 to 1.

The gasoline fuel system was a production port fuel injection (PFI) system that is operated in the simultaneous double fire mode when using the engine control computer. We operated the engine manually using an engine set point controller, and the injectors were fired sequentially and synchronously We evaluated the engine with a gasoline fuel and found that fuel consumption and exhaust emissions were unaffected by the manual method of operating the port fuel injectors.

In most of our tests, we used 99+% pure methane gas. In some tests we used a synthetic natural gas that contained about 89.5 percent by volume methane, about 5 percent nitrogen, 4 percent ethane, 1 percent propane and about ½ percent normal butane most of the data reported in this specification was obtained by operating our engine with substantially pure methane because natural gas was not available in our test cell and because it varies in composition.

Figure 1:
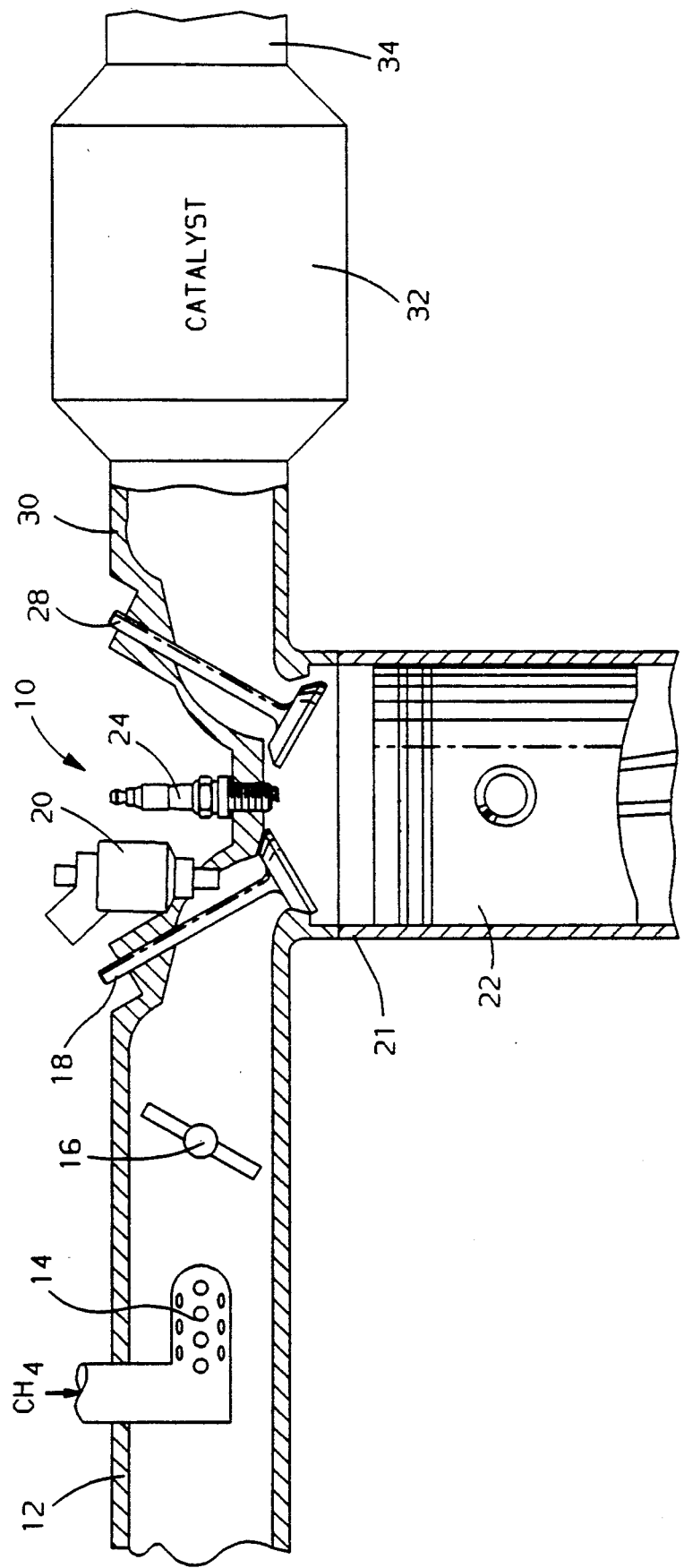
FIG. 1 is a schematic of a fuel system, an engine combustion chamber and a catalytic converter to illustrate the practice of our invention.

Referring to FIG. 1, we introduced our gaseous methane fuel at low pressure through a sparger 14 located in the intake manifold 12 of sectioned engine schematic 10. The sparger 14 was located just upstream of the throttle 16 so that the methane mixed with air in the manifold 12. The premixed methane-air mixture flowed through opened throttle 16, past intake valve 18 (shown closed) into engine cylinder 21. In our work we did not use the port fuel injector shown at 20, but such an injector could be used to introduce methane into an operating engine. The air-fuel mixture upon compression by piston 22 is ignited by spark plug 24 to commence the power stroke of the piston 22. Cylinder pressure was measured with a suitable sensor and transducer, and the exhaust gas was forced from the engine cylinder during the exhaust stroke of the piston past opened exhaust valve 28, through exhaust pipe 30, into catalytic converter 32 and out tailpipe 34. This representation is, of course, only schematic to illustrate the flow of the air-methane fuel mixture into one cylinder of the engine and the exhaust gases out of the cylinder through the exhaust system.

In the conduct of our tests, we exercised approximate control over the flow of methane as follows. The methane was stored in high pressure cylinders. Regulators on the methane cylinders were used to decrease gas pressure from about 17 to 0.7 MPa. The gas flowed through a critical flow nozzle which was the prime means of measuring and controlling the gaseous fuel flow. A volume gas flowmeter located downstream of the critical flow nozzle was a secondary means of measuring gaseous fuel flow. Thus, methane entered the sparger 14 in FIG. 1 at a fairly low pressure. We did not measure air flow into the engine but allowed the normal induction process of the engine to control the flow of the air and the fuel into the combustion chamber. However, we used emission analyzer instruments to continuously analyze the composition and quantity of the exhaust both in the exhaust pipe 30 before the catalytic converter 32 and in the tailpipe 34 downstream of the catalytic converter. This data permitted the calculation of a material balance on the incoming stream and the exhaust stream to provide a precise value of the air-to-fuel ratio entering the engine. We were able to measure methane content of the exhaust as well as total hydrocarbons. We were able to measure the carbon monoxide, carbon dioxide and nitrogen oxide content of the exhaust. To determine the actual exhaust gas recirculation (EGR) ratio, carbon dioxide was measured in the intake port to the first cylinder of the engine. Other instrumentation was employed to provide us with accurate data concerning engine operations important with operating details not particularly relevant to the practice of the invention herein described.

Our engine was used to drive a dynamometer. Since we did not have sophisticated fuel controls for instantaneously determining and adjusting a fuel-air ratio, we operated our engine at steady state air-fuel ratio conditions by holding constant for specified time intervals the engine operating conditions of engine speed and brake torque. We used a computer engine simulation program to specify a number of steady state operating conditions which could reliably simulate the Federal Test Procedure (FTP) and the Federal Highway Test Procedure. A ten-point test and a shorter two-point test, which were specifically developed for the engine dynamometer combination, are summarized below. These tests involved no transient conditions and no warm-up features of the federal test procedures.

| | | Ten-Point and Two-Point FTP and Highway Test Conditions | | | |
|---|---|---|---|---|---|
| Point No. | Schedule | Engine Speed (r/min) | Brake Torque (N-M) | Energy (kW-h) | Time (s) |
| | | 10-point test | | | |
| 1 | FTP | 689 | 21.7 | 0.14795 | 340.18 |
| 2 | FTP | 966 | 10.3 | 0.07147 | 246.92 |
| 3 | FTP | 1361 | 31.2 | 0.34392 | 278.42 |
| 4 | FTP | 1587 | 51.2 | 0.49864 | 210.96 |
| 5 | FTP | 1864 | 74.3 | 0.61906 | 153.66 |
| 6 | FTP | 2345 | 45.1 | 0.20920 | 68.00 |
| 7 | FTP | 2364 | 102.4 | 0.51828 | 73.60 |
| 8 | HWY | 1776 | 56.5 | 0.66413 | 227.52 |
| 9 | HWY | 2210 | 50.8 | 0.84625 | 259.12 |
| 10 | HWY | 2542 | 56.3 | 1.15170 | 276.63 |
| | | 2-point test | | | |
| 11 | FTP | 1317 | 37.0 | 2.376 | 1372.0 |
| 12 | HWY | 2201 | 50.8 | 2.544 | 763.3 |

Operation of the engine with a gasoline fuel on the ten-point test protocol gave excellent estimates of fuel economy compared with the actual certification data obtained on the engine for both the city (FTP) test and the highway test mileage data. Thus, we have confidence that our data based on these steady state operations is reasonably comparable to what could be obtained by operating the same methane-fueled engine-dynamometer in the FTP and HWY schedules. In some instances, in the specification where we report data for a single point test, we used either the engine speed and brake torque conditions of step 1 (point 11 above) of the two-point test or step 3 of our ten-point test.

We operated our engine on the above test protocols with varying proportions of methane and air and in combination with a number of different exhaust catalysts. We carefully identified and measured the engine-out and tailpipe-out exhaust constituents for each air-fuel mixture. This data enabled us to measure the effectiveness of our engine operating practice and exhaust catalyst for each air-methane mixture.

Figure 2:
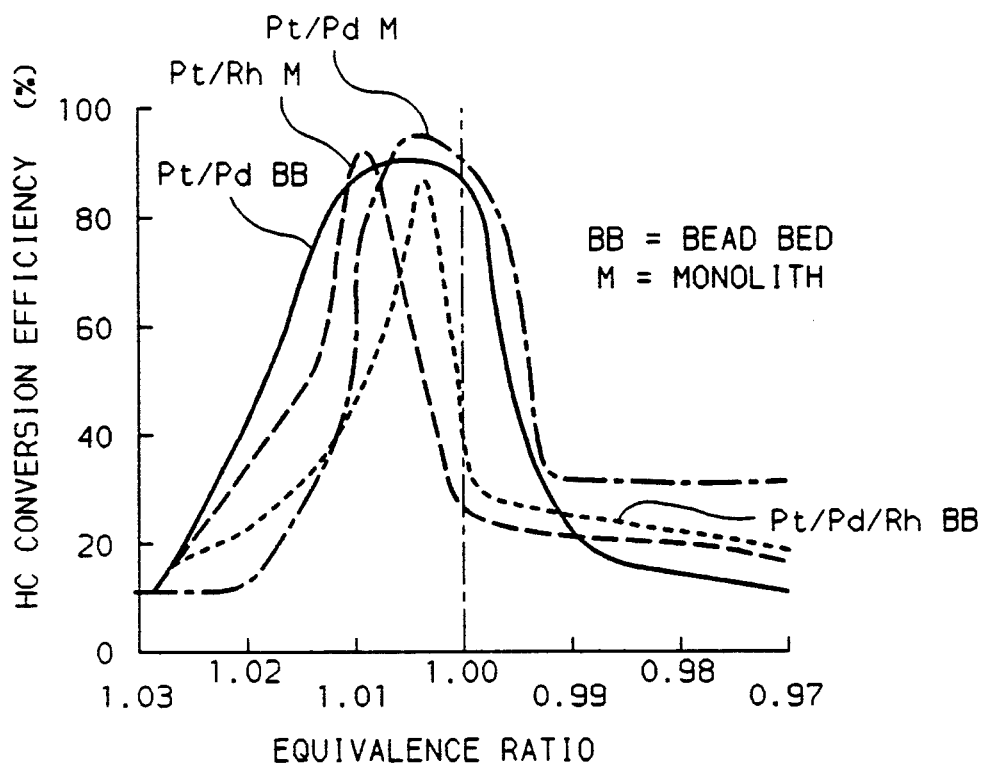
FIG. 2 is a plot of hydrocarbon conversion efficiency versus fuel-air equivalence ratio obtained during the operation of a methane-fueled engine utilizing different noble metal catalysts.

We tabulated our air-fuel mixture data in terms of an "equivalence ratio", which is the ratio of the actual fuel mass to air mass ratio to the stoichiometric fuel-air ratio. Thus, an equivalence ratio greater than 1 is fuel-rich and one less than 1 is fuel-lean. An equivalence ratio of 1 is the stoichiometric air-methane mixture and is shown in FIG. 2 as a vertical line separating the fuel-rich and fuel-lean equivalence ratio values.

We have evaluated a number of different catalysts including noble metal catalysts in our tests with the methane-fueled engine. Four different catalytic converters will be described in connection with data obtained in the specification. Each had a volume suitable for use with the 2.8 L engine They are as follows. Number 1 was a platinum/palladium bead bed (Pt/Pd BB). A quantity of beads (160 in$^3$ bed volume) containing a total of 0.072 troy ounces of platinum and 0.029 troy ounces of palladium deposited on a ceria ($CeO_2$) modified alumina ($Al_2O_3$) support. The concentration of the Pt on the beads was 0.17 percent by weight and the Pd concentration was 0.06 percent. Number 2 was a platinum/palladium monolith (Pt/Pd M). This converter included two 400 channel opening per square inch monolith-type cordierite honeycomb supports on which a ceria-modified alumina washcoat was deposited with platinum and palladium loadings equivalent to those of the bead bed described in connection with catalyst 1. The dual extruded cordierite supports were in series flow relationship and had a total volume of about 170 in$^3$. Number 3 was a 160 in$^3$ production three-way platinum/palladium/rhodium bead bed (Pt/Pd/Rh BB) for use with a 2.8 L V-6 engine and containing 0.048 troy ounces of platinum, 0.019 troy ounces of palladium and 0.006 troy ounces of rhodium on a ceria-modified alumina support. Number 4 was a production three-way platinum/rhodium alumina (stabilized with ceria) washcoated cordierite monolith (Pt/Rh M). This was a production monolith 170 in$^3$ dual bed monolith catalyst containing 0.07 troy ounce of platinum and 0.0078 troy ounce of rhodium.

In general and as is known, the alumina supports are a high surface area alumina such as gamma alumina on which about 7 percent by weight of ceria has been deposited. Typically, the ceria is deposited on the high surface area alumina from an aqueous solution of a water soluble cerium salt. The cerium salt impregnated alumina is calcined to form a ceria modified alumina.

The noble metals are deposited on the alumina carrier, whether in the form of beads or in the form of fine particles, by dispersion of the noble metals as an aqueous salt solution onto the solid alumina. After the alumina has been impregnated with the noble metal compound(s), the alumina beads or alumina washcoat material (for the monolith-type converter) is calcined to fix the noble metal in the form of a dispersion of extremely finely divided particles on the alumina-based carrier.

As indicated, we operated our V-6 engine with methane fuel over a wide range of fuel-air ratios from quite lean to the rich side of the stoichiometric fuel-air ratio. We ran these experiments with production three-way (rhodium-containing) catalysts found to provide the best conversion efficiency of unburned hydrocarbons, carbon monoxide and nitrogen oxides in gasoline-fueled engines. We ran both the bead bed and monolith versions of the three-way catalysts. We also ran a number of other noble metal catalysts and a base metal catalyst, some of which were run on our laboratory reactor utilizing a synthetic exhaust consisting of 2000 ppm $CH_4$, 1000 ppm CO, variable $O_2$ and the balance He.

The best of these catalysts for the complete conversion of the exhaust gas constituents from the methane-fueled engines were the platinum/palladium catalysts described above, both in bead and monolith versions. FIG. 2 summarizes in graphical form the hydrocarbon conversion efficiency of four different representative catalytic converters used with our methane-fueled engines. The data reported in FIG. 2 is that clustered about the stoichiometric air-fuel ratio because it is the most relevant to the practice of our invention.

Experience with gasoline-fueled engines has taught that conversion of unburned hydrocarbons is favored under lean operating conditions where there is abundant oxygen in the exhaust gas to complete the combustion of these unburned hydrocarbons. Typically, the oxygen content of the exhaust gas should be that resulting from a fuel-lean combustion mixture, at least on a continual momentary basis, to facilitate oxidation of CO and HC over noble metal catalysts. Therefore, with the use of natural gas-fueled engines where only low molecular weight hydrocarbons are present, it was anticipated that lean operation would be favored because it would be possible to achieve both full conversion (oxidation) of hydrocarbons and good fuel economy. However, where one is concerned with the elimination of methane emissions, FIGS. 2 (engine data) and 3 (laboratory reactor data) summarize our data showing that on average the engine should not be operated in the lean mode. It should on average be operated just on the rich side of the stoichiometric fuel-to-air ratio.

Figure 3:
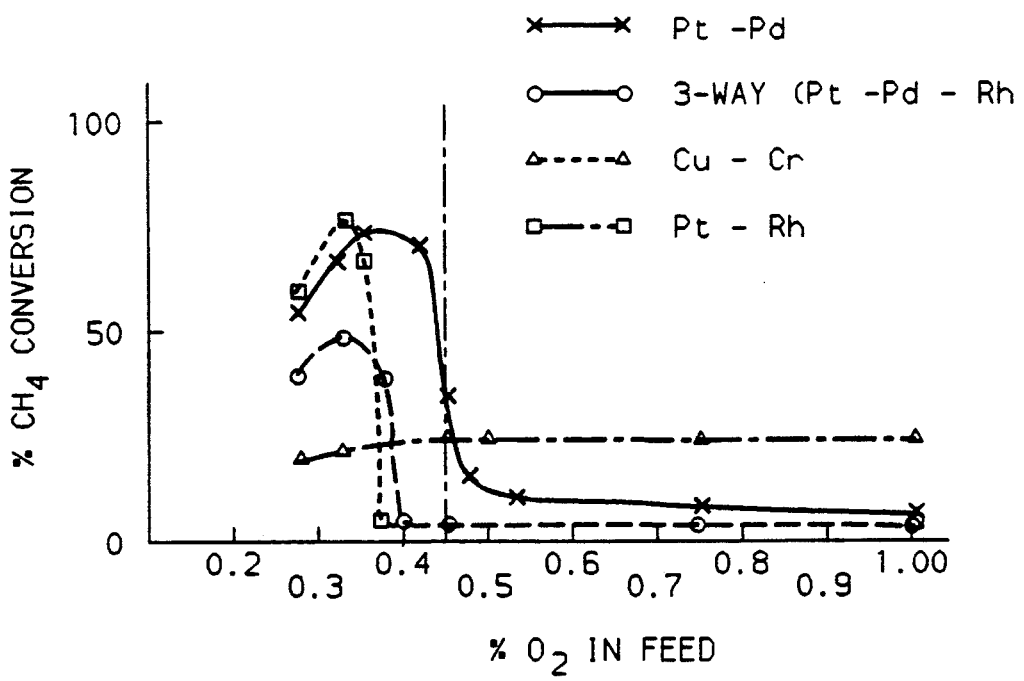
FIG. 3 is a plot of methane conversion versus oxygen content in a synthetic exhaust feed to a laboratory catalytic reactor for a group of noble metal catalysts and a base metal catalyst.

The plotting of the data in FIGS. 2 and 3 allows a comparison of the effectiveness of the respective described catalytic converter on the conversion of hydrocarbons and especially methane from a methane-fueled engine (FIG. 2) and methane-containing, synthetic exhaust laboratory reactor (FIG. 3). The laboratory reactor data is consistent with our engine data. Both the rhodium-containing three-way catalysts and the rhodium-free platinum/palladium catalysts demonstrate relatively high conversion of the unburned hydrocarbons and methane exiting the methane-fueled engine. However, it is seen that higher efficiencies can be obtainable with the platinum/palladium catalyst and, more significantly, that these efficiencies are obtained over a much broader range of fuel-air ratios. The peak effectiveness of hydrocarbon and methane conversion for all of the catalysts is clearly just in the fuel-rich side of the stoichiometric fuel-air mixture. However, the peak HC conversion efficiency values for the platinum/palladium catalysts were realized over a several-fold broader range than were the peak values for the traditional three-way rhodium-containing catalysts. Furthermore, as will be described in more detail below, our fuel-rich operation/platinum-palladium catalyst practice produces higher hydrocarbon conversion efficiencies at lower temperatures ($\leq 300°$ C.) than do the rhodium-containing three-way catalysts. This is very important in the normal operation of an automobile engine because higher methane conversion can be obtained during warm-up and over the considerably wider range of fuel-to-air ratios that would be experienced in the normal operation of an automobile engine.

FIG. 3 is a plot analogous to that of FIG. 2. Methane conversion data is plotted against the oxygen content of a synthetic exhaust stream comprising 2000 ppm $CH_4$, 1000 ppm CO, variable oxygen content and the balance helium, preheated to 1000° F. and entering the catalytic converter at 52,000 gas hourly space velocity. The vertical mark at approximately 0.45 oxygen content in the exhaust stream simulates an exhaust produced at a stoichiometric fuel-to-air ratio. This data permits a comparison of the effectiveness of our Pt/Pd catalyst, rhodium-containing three-way catalysts and a copper-chromium base metal catalyst Again, it is seen that the rhodium-free platinum-palladium catalyst provides high methane conversion efficiency over a much broader range of oxygen content in the exhaust gas.

While we are especially concerned with methane conversion in the exhaust gas, the other more widely recognized exhaust constituents must also be converted through careful engine operation and exhaust gas catalytic treatment. The tailpipe emissions of unburned hydrocarbons, carbon monoxide and nitrogen oxide must all be low and within federal and state standards. The following table summarized data obtained from our methane-fueled engine under fuel-lean as well as substantially stoichiometric air-fuel operating conditions. Although higher fuel economy is obtained under lean operating conditions, it is seen that the exhaust emissions increase appreciably. It is also seen that the use of our platinum/palladium catalysts in either bead bed or monolith form provides excellent treatment of the exhaust gas.

| Ten-Point Engine-Dynamometer Test Results | | | | |
|---|---|---|---|---|
| | Bead Bed | | Monolith | |
| Pt/Pd Catalyst | $CH_4$ Stoic. | $CH_4$ Lean | $CH_4$ Stoic. | $CH_4$ Lean |
| Equivalence Ratio | 1.000 | 0.757 | 1.002 | 0.775 |
| Fuel Economy: | | | | |
| City MPG | 22.5 | 24.4 | 22.2 | 23.7 |
| Highway MPG | 30.6 | 33.0 | 30.3 | 31.8 |
| 55/45 MPG | 25.6 | 27.7 | 25.3 | 26.8 |
| FTP Emissions (engine-out): | | | | |
| HC g/mi | 0.215 | 1.62 | 0.078 | 1.94 |
| | (1.73) | (2.28) | (1.87) | (2.31) |
| % Dec. | 87.5% | 28.9% | 95.8% | 16.0% |
| CO g/mi | 0.179 | 0.006 | 0.090 | 0.024 |
| | (9.94) | (1.28) | (7.61) | (1.20) |
| % Dec. | 98.2% | 99.5% | 98.8% | 98.0% |
| NOx g/mi | 0.050 | 0.449 | 0.010 | 0.480 |
| | (2.17) | (0.477) | (1.75) | (0.485) |
| % Dec. | 97.7% | 5.9% | 99.4% | 1.0% |
| Greenhouse Gases (55/45, tailpipe): | | | | |
| $CO_2$ g/mi | 257 | 234 | 260 | 241 |
| $CO_2$ + 80*$CH_4$ g/mi | 266 | 350 | 261 | 382 |

The data in the above table is a composite of the results of engine operation over the ten-point operating regime described above. It is seen that our Pt/Pd catalysts (bead or monolith) when used in conjunction with stoichiometric to just fuel-rich engine operation provides very low emissions of all of HC, CO and NOx.

In summary, we have found that in the operation of a methane-fueled engine it is preferable to operate the engine close to the stoichiometric fuel-to-air ratio with the average value biased to the fuel-rich side of that ratio. In general, the engine is preferably operated over and within a range of about two percent variation in the air-fuel ratio biased toward the fuel-rich side of stoichiometry. It is to be understood, however, that there may be occasional wider excursions of the fuel-to-air ratio that are of short duration. Expressed in terms of equivalence ratio described above and as illustrated in FIG. 2, we prefer to operate a methane-fueled engine at values within the range from 0.99 to 1.02.

In combination with the engine operation as described, we employ a platinum or platinum and palladium catalyst (on an alumina-based carrier) for the treatment of the exhaust gases It is preferred that they be used in combination. In this way in general lower quantities of the more expensive platinum can be used. In the combination, 2 to 3 parts of Pt per part of Pd are suitable Our laboratory data has also shown that platinum alone is suitable for use in the practice of our invention. The actual noble metal loadings for use in accordance with our invention will, of course, depend on the size of the engine, the durability required and the like.

We prefer that the noble metal be dispersed as described above on an alumina carrier. The alumina-based carrier may be in the form of beads or pellets or in the form of a washcoat on a cordierite or metal monolith. Alumina beads are generally about ⅛ inch in diameter and composed of thermally stable transition alumina phases An alumina washcoat is applied to the surface of the monolith as a thin slurry to form a 30 to 50 micron thick coating. In either form, pellet or small particle washcoat, the alumina has a high surface area of approximately 100 m²/gram on which the very fine particles of noble metal are dispersed.

Our platinum or platinum and palladium catalyst displays high conversion efficiency for each of HC, CO and NOx over a wide range of fuel-to-air ratios in the stoichiometric to fuel-rich regime. In this regard, it is significantly more effective than three-way catalysts. In addition to permitting a wider fuel-air ratio range, our catalysts also perform better at low engine-out exhaust temperatures. For example, exhaust gas temperatures at catalyst inlet as low as 300° C. can be experienced during engine start-up and at engine idle. Our tests with our methane-fueled engine at essentially stoichiometric operation show that both our Pt/Pd M and Pt/Pd BB converters retained much higher (i.e., about 50 percent higher) HC conversion efficiency than did a platinum/rhodium monolith converter, a platinum/palladium/rhodium bead converter or a palladium bead converter. This low temperature emission control performance was unexpected by us and is of appreciable value to clean engine operation.

While our invention has been described in terms of a few preferred embodiments thereof, it will be appreciated that other forms could readily be adopted by one skilled in the art.

The embodiments of the invention in which an exclusive property or privilege is claimed are defined as follows:

1. A method of operating a methane-fueled automotive vehicle engine and of treating the exhaust gas from such engine so as to simultaneously minimize emissions of methane, other hydrocarbons, carbon monoxide and nitrogen oxides, comprising controlling the composition of methane-containing fuel-air mixtures supplied to the combustion chambers of the engine to values including the stoichiometric mixture and fuel-rich side mixtures within about two percent of the stoichiometric mixture, and immediately contacting the combustion products with a catalyst consisting essentially of platinum or platinum and palladium dispersed as fine particles on an alumina-based carrier.

2. A method of operating a methane-fueled automotive vehicle engine and of treating the exhaust gas from such engine so as to simultaneously minimize emissions of methane, other hydrocarbons, carbon monoxide and nitrogen oxides, comprising controlling the composition of methane-containing fuel-air mixtures supplied to the combustion chambers of the engine to equivalence ratio values including the stoichiometric mixture and within the range of 0.99 to 1.02, and immediately contacting the combustion products with a catalyst consisting essentially of platinum or platinum and palladium dispersed as fine particles on an alumina-based carrier.

3. A method of operating a methane-fueled automotive vehicle engine and of treating the exhaust gas from such engine so as to simultaneously minimize emissions of methane, other hydrocarbons, carbon monoxide and nitrogen oxides, comprising controlling the composition of methane-containing fuel-air mixtures supplied to the combustion chambers of the engine to equivalence ratio values including the stoichiometric mixture and within the range of 0.99 to 1.02, and immediately contacting the combustion products with a catalyst consisting essentially of two to three parts of platinum and one part of palladium dispersed as fine particles on an alumina-based carrier.

* * * * *